United States Patent [19]

Yukawa

[11] Patent Number: 4,630,707
[45] Date of Patent: Dec. 23, 1986

[54] SOUND-ABSORBING STRUCTURE IN VEHICULAR COMPARTMENT

[75] Inventor: Shinjiro Yukawa, Isehara, Japan

[73] Assignee: Nissan Motor Company, Limited, Kanagawa, Japan

[21] Appl. No.: 770,978

[22] Filed: Aug. 30, 1985

[51] Int. Cl.⁴ .............................................. E04B 1/82
[52] U.S. Cl. ................................... 181/288; 181/290; 181/295
[58] Field of Search ................ 181/288, 290, 291, 295, 181/211

[56] References Cited

U.S. PATENT DOCUMENTS 4,340,129 7/1982 Salyers ............................ 181/290 X

OTHER PUBLICATIONS

Automotive Engineering Manual, section 6, by Society Automotive Engineers of Japan, Inc.

Primary Examiner—Benjamin R. Fuller
Attorney, Agent, or Firm—Leydig, Voit & Mayer

[57] ABSTRACT

A sound-absorbing structure in a vehicular compartment can prevent the air within the compartment from passing out through the lining and thus prevent deposition of dust onto the inner surface of the lining. The structure includes a panel forming part of a vehicular body and allowing air leakage, a porous sound-absorbing lining separated from the inner surface of the panel by a space and a partition for preventing air leakage, the partition being air-impermeable and disposed in the space. The lining and the partition define an air chamber enhancing the sound-absorbing properties of the lining.

5 Claims, 7 Drawing Figures

SOUND-ABSORBING STRUCTURE IN VEHICULAR COMPARTMENT

BACKGROUND OF THE INVENTION

1. Field of the Invention

This invention relates to a sound-absorbing structure in a vehicular compartment.

2. Description of the Prior Art

FIGS. 6 and 7 illustrate a prior art sound-absorbing structure built into the roof of an automotive vehicle. This structure comprises a roof panel 1 and a molded head lining 2 made of an acoustic material and separate from the roof panel 1. The roof panel 1 and the head lining 2 lie parallel, leaving an air chamber 3 therebetween. As shown in FIG. 7, the head lining 2 comprises a substrate 4 made of corrugated cardboard or a gas-permeable material, and a nonwoven fabric 5 covering the inner surface of the substrate 4 (See Automotive Engineering Manual, section 6, issued by SOCIETY AUTOMOTIVE ENGINEERS OF JAPAN INCORPORATION). In this sound-absorbing structure, the air chamber 3 enhances the acoustical properties of the head lining 2 so as to keep the passenger compartment quiet.

However, since the air in the passenger compartment leaks out of the vehicle through the head lining 2 and the air chamber 3 due to the negative pressure developed by movement of the vehicle, the head lining 2 consequently acts as an air filter and thus collects dust from within the passenger compartment. The dust dirties the outer surface of the head lining 2 and degrades the appearance of the head lining 2.

SUMMARY OF THE INVENTION

An object of this invention is to provide a sound-absorbing structure in a vehicular compartment which will not soil the surface of a porous sound-absorbing lining. In order to achieve this object, this invention includes a panel forming part of a vehicular body and allowing air leakage, a porous sound-absorbing lining separated from the inner surface of the panel by a space, means for preventing air leakage, the means being gas and disposed within the space. The lining and the means define an air chamber enhancing the sound-absorbing capacity of the lining. The air-tightness afforded by the means can prevent the air within the vehicular compartment from passing out through the lining and thus prevent deposition of dust onto the inner surface of the lining.

DESCRIPTION OF THE PREFERRED EMBODIMENTS

Figure 1:
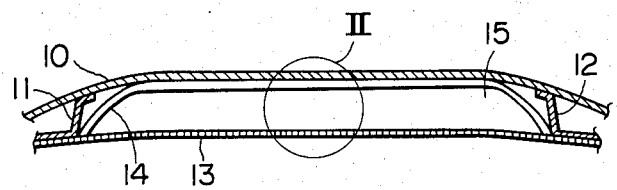
FIG. 1 is a cross-sectional view of a vehicular sound-absorbing structure according to a first embodiment of this invention.
Figure 2:
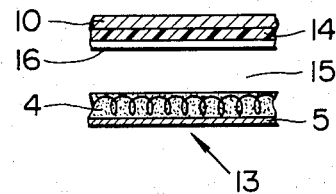
FIG. 2 is an enlarged view of the encircled part II of FIG. 1.

The preferred embodiments of this invention will be described below with reference to FIGS. 1 to 5. In particular, FIGS. 1 and 2 illustrate a sound-absorbing structure in a vehicular roof according to a first embodiment of this invention. A vehicular roof structure comprises a roof panel 10, a pair of front and rear roof rails 11 and 12 respectively, a head lining 13, and a gas-impermeable sheet 14.

Figure 7:
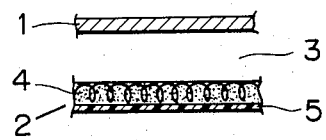
FIG. 7 is an enlarged view of the encircled part VII of FIG. 6.

The roof panel 10, the front and rear roof rails 11 and 12, and the head lining 13 bound an air chamber 15. The head lining 13 is similar to the lining 2 shown in FIG. 7. The sheet 14 is made of, e.g. synthetic resin and supported by a framework of metal rods 16. Most of the sheet 14 is held in contact with the inner surface of the roof panel 10 within the air chamber 15. The edges of the sheet 14 are sandwiched between the roof rails 11 and 12 and the head lining 13 in order to fix the sheet 14 in place. The sheet 14 keeps the air chamber 15 air-tight.

In this embodiment, the presence of the air chamber 15 enhances the sound-absorbing effect of the head lining 13 and the air-tightness of the sheet 14 prevents air from escaping the air chamber 15, so that the inner surface of the head lining 13 will not collect dust from the air within the passenger compartment.

Figure 3:
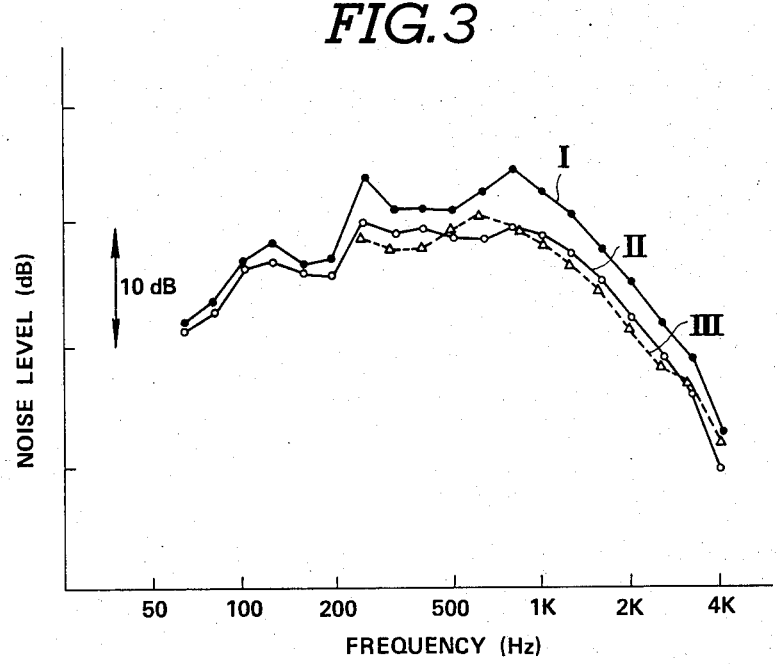
FIG. 3 is a graph of the noise level spectrum in the passenger compartment of a vehicle using the sound-absorbing structure of FIG. 1 during operation of the vehicle.

FIG. 3 shows the results of tests on the sound-absorbing effects of this embodiment and prior art sound-absorbing structures. All of the tests of sound-absorbing effects were conducted in the front seat of an automotive vehicle travelling at a speed of 100 km/h.

In FIG. 3, the X-axis represents the audio frequency and the Y-axis represents the noise intensity. The curve I represents the sound-absorbing effect of a control sample I lacking an air chamber such as the air chamber 3 shown in FIG. 1. The curve II represents the sound-absorbing effect of prior-art sample II shown in FIG. 6. The curve III represents the sound-absorbing effect of this embodiment.

Figure 6:
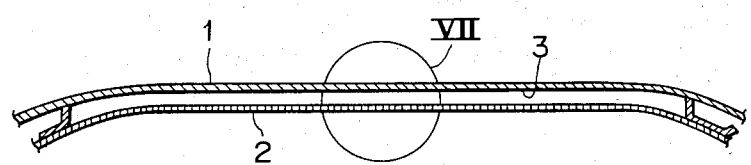
FIG. 6 is a cross-sectional view of a prior art vehicular sound-absorbing structure.

As is apparent from FIG. 3, since the curves II and III essentially overlap, the sound-absorbing effect of this embodiment is essentially equal to that of sample II shown in FIG. 6.

Figure 4:
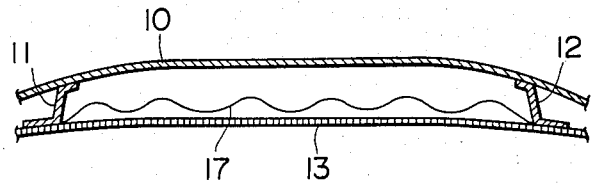
FIG. 4 is a cross-sectional view of a vehicular sound-absorbing structure according to a second embodiment of this invention shown while the vehicle is at rest.
Figure 5:
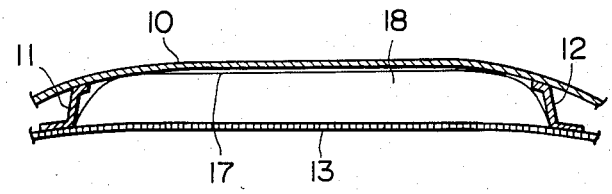
FIG. 5 is a cross-sectional view of the vehicular sound-absorbing structure of FIG. 4 shown while the vehicle is in motion.

FIGS. 4 and 5 illustrate a sound-absorbing structure in a vehicular roof according to a second embodiment of this invention. This sound-absorbing structure differs from the sound-absorbing structure according to the first embodiment in that a flexible gas-impermeable sheet 17 has no rigid support. As shown in FIG. 4, when the vehicle is at rest, the sheet 17 slackens. As shown in FIG. 5, when the vehicle is moving, the negative pressure generated by movement of the vehicle and the positive ventilation pressure from a blower within the passenger compartment inflates the sheet 17 upwards so that the sheet 17 and the head lining 13 define an air chamber 18 similar to the air chamber 15. This embodiment of a sound-absorbing structure can be manufactured at a lower cost.

In another embodiment, a gas-impermeable sheet may be attached to the inner surface of the roof panel 10.

This invention is applicable to other parts of vehicle compartments such as a rear parcel shelf.

What is claimed is:

1. A sound-absorbing structure in a vehicular compartment, comprising:
   a panel forming part of a vehicular body;
   a porous sound-absorbing lining separated from the inner surface of said panel by a space; and
   means, being air-impermeable and disposed within the space, for preventing air leakage between the inside and the outside of the vehicular compartment through the space, said sound-absorbing lining and said preventing means defining an air chamber.

2. A sound-absorbing structure in a vehicular compartment as recited in claim 1, wherein said preventing means comprises a flexible air-impermeable sheet which swells toward said panel when air pressures outside and inside the vehicular compartment differ.

3. A sound-absorbing structure in a vehicular compartment comprising:
   a panel forming part of a vehicular body;
   a porous sound-absorbing lining separated from the inner surface of said panel by a space; and
   means, including a rigid frame and an air-impermeable sheet attached to the frame and disposed within the space, for preventing air leakage, said sound-absorbing lining and said preventing means defining an air chamber.

4. A sound-absorbing structure in a vehicular compartment as recited in claim 3, wherein the frame substantially conforms to said panel, the center of the sheet being held in contact with the inner surface of said panel and the edges of the sheet being fixed to said sound-absorbing lining.

5. A sound-absorbing structure in a roof of an automotive body, comprising:
   a roof panel;
   a porous head lining separated from the inner surface of said panel by a space; and
   an air-impermeable partition for preventing air leakage between the inside and the outside of the vehicular compartment through the space, said partition being disposed within the space and defining an air chamber in conjunction with said head lining.

* * * * *